United States Patent
Shibahara et al.

(10) Patent No.: US 6,608,692 B1
(45) Date of Patent: Aug. 19, 2003

(54) IMAGE PROCESSING APPARATUS, METHOD, AND COMPUTER-READABLE STORAGE MEDIUM FOR STORING PROGRAMS USED THEREIN

(75) Inventors: Yasuko Shibahara, Inagi (JP); Yasutaka Noguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/217,938

(22) Filed: Dec. 22, 1998

(30) Foreign Application Priority Data

Dec. 26, 1997 (JP) .............................. 9-358686
Dec. 21, 1998 (JP) ........................... 10-362418

(51) Int. Cl.$^7$ .............................. G06F 15/00; G06K 1/00
(52) U.S. Cl. ................... 358/1.13; 358/440; 358/1.6; 358/328; 358/296; 358/401; 358/1.15; 358/1.1; 358/464
(58) Field of Search .................... 358/440, 1.6, 3.28, 358/1.15, 296, 401, 1.13, 1.1, 464

(56) References Cited

U.S. PATENT DOCUMENTS

| | | | |
|---|---|---|---|
| 5,125,149 A | 6/1992 | Inaba et al. | |
| 5,216,724 A | 6/1993 | Suzuki et al. | |
| 5,227,871 A | 7/1993 | Funada et al. | |
| 5,321,470 A | 6/1994 | Hasuo et al. | |
| 5,353,058 A | 10/1994 | Takei | |
| 5,390,003 A * | 2/1995 | Yamaguchi et al. | 382/135 |
| 5,424,852 A | 6/1995 | Funada | |
| 5,633,952 A | 5/1997 | Outa et al. | |
| 5,638,183 A | 6/1997 | Hayashi et al. | |
| 5,659,628 A * | 8/1997 | Tachikawa et al. | 382/135 |
| 5,784,483 A | 7/1998 | Takaragi et al. | |
| 5,828,777 A | 10/1998 | Suzuki | |
| 6,052,204 A * | 4/2000 | Mori et al. | 358/296 |
| 6,185,321 B1 * | 2/2001 | Fukushima et al. | 382/135 |
| 2002/0135810 A1 * | 9/2002 | Ikenoue et al. | 358/3.28 |

FOREIGN PATENT DOCUMENTS

JP 63-113801 5/1988

* cited by examiner

Primary Examiner—Edward Coles
Assistant Examiner—Ashanti Ghee
(74) Attorney, Agent, or Firm—Fitzpatrick, Cella, Harper & Scinto

(57) ABSTRACT

Trace information showing a fact that an illegal output request has been issued from any one of data processing apparatuses is managed. Under an output environment such that an output apparatus is shared from a plurality of data processing apparatuses, when it is detected that a kind of data received by a CPU is specific data such that an output is legally limited, information to identify a transfer source side of the specific data or the received data is preserved and managed in a RAM or the like.

13 Claims, 4 Drawing Sheets

FIG. 7

STORAGE MEDIUM SUCH AS
FD / CD-ROM AND OTHERS

| DIRECTORY INFORMATION |
|---|
| 1ST DATA PROCESSING PROGRAM PROGRAM CODES CORRESPONDING TO STEP IN FLOW CHART OF FIG. 4 |
| 2ND DATA PROCESSING PROGRAM PROGRAM CODES CORRESPONDING TO STEP IN FLOW CHART OF FIG. 5 |
| 3RD DATA PROCESSING PROGRAM PROGRAM CODES CORRESPONDING TO STEP IN FLOW CHART OF FIG. 6 |
| |

MEMORY MAP OF STORAGE MEDIUM

IMAGE PROCESSING APPARATUS, METHOD, AND COMPUTER-READABLE STORAGE MEDIUM FOR STORING PROGRAMS USED THEREIN

BACKGROUND OF THE INVENTION

1. Field of the Invention

The invention relates to image processing apparatus and method for processing output requests from a plurality of data processing apparatuses through a predetermined communication medium. The invention also relates to a computer-readable storage medium on which programs used therein have been stored.

2. Related Background Art

In recent years, in such a kind of output apparatus, the realization of a high picture quality for various image outputs including a color image is progressing and an output result of a picture quality which is desired by the user is obtained.

However, a case of illegally outputting (fake output) bills or the like is considered due to the realization of such a high picture quality. In an output apparatus in which such a problem is prevented, various fake preventing means such as means for adding some patterns to an output result or the like, fake detecting means for detecting whether a forgery has been performed or not, and the like are provided. Those means are effective to specify a person who performed a illegal act.

However, since an information amount is small in case of using only the conventional methods, there is a problem such that it is difficult to specify a person who performed an illegal act on occasion.

SUMMARY OF THE INVENTION

The invention is made to solve the above problems and it is an object to provide a novel function.

Another object of the invention is that, for example, in the case where it is detected that the kind of received data indicates specific data such that the printing of its output is legally limited under an output environment in which an output apparatus is shared by a plurality of data processing apparatuses, information to identify a transfer source of the data or the received data is preserved and managed or the reception of illegal data whose printing is limited is notified to the outside.

Still another object of the invention is to manage trace information showing that an illegal output request is generated from any one of a plurality of data processing apparatuses.

Further another object of the invention is to notify a manager on the outside of a generating state of an illegal output request, thereby raising a monitoring consciousness for an output request of specific data.

Further another object of the invention is to provide image processing apparatus and method to realize the above objects and to provide a computer-readable storage medium on which programs used therein have been stored.

To accomplish the above objects, according to the invention, there is provided an image processing apparatus comprising:

discriminating means for analyzing data which is received from a plurality of data processing apparatuses and discriminating whether the received data is specific data whose output is limited or not; and storing means for storing information regarding the data processing apparatus which transmitted the received data when it is determined by the discriminating means that the received data is the specific data.

The above and other objects and features of the present invention will become apparent from the following detailed description and the appended claims with reference to the accompanying drawings.

BRIEF DESCRIPTION OF THE DRAWINGS

FIG. 7 is a diagram for explaining a memory map of a storage medium to store various data processing programs which can be read out by an output system to which the output control apparatus according to the invention can be applied.

DETAILED DESCRIPTION OF THE PREFERRED EMBODIMENTS

[First Embodiment]

An example of a construction of a laser beam printer will be first described as an example of an output apparatus to which an embodiment of the invention can be applied. The embodiment can be applied to not only a laser beam printer but also an output apparatus of another system such as ink jet printer, bubble jet printer, or the like. The invention can be also applied as a print control apparatus or a printing apparatus having the print control apparatus.

Figure 1:
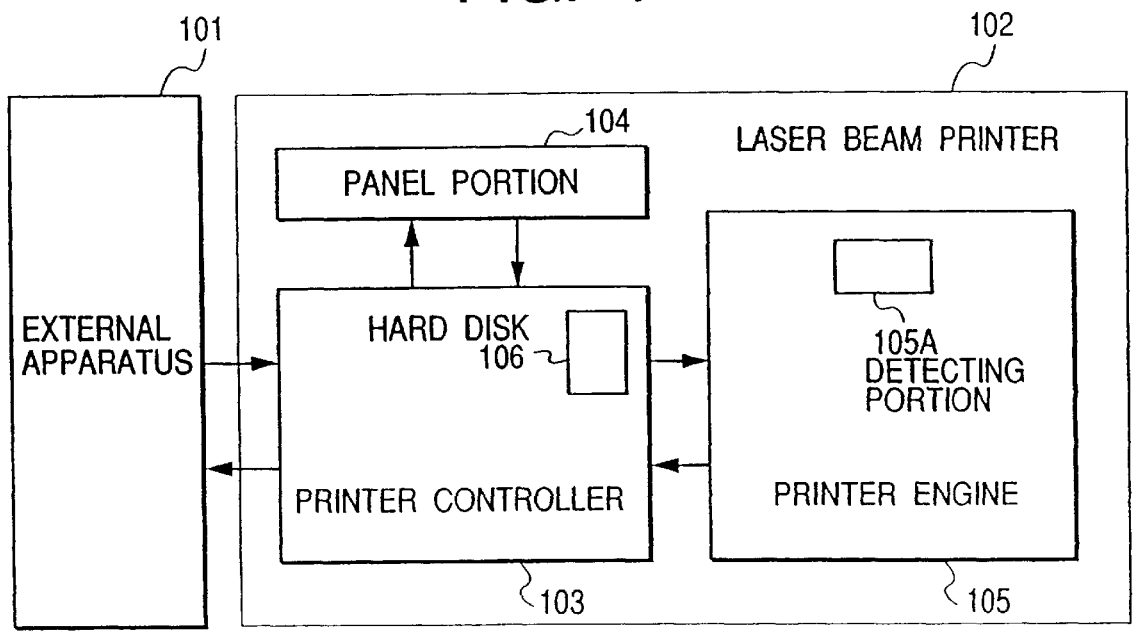
FIG. 1 is a block diagram for explaining an outline of a printing system to which a print control apparatus according to the invention can be applied.

FIG. 1 is a block diagram for explaining an outline of a printing system to which a print control apparatus (image processing apparatus) according to the invention can be applied. For example, the printing system corresponds to a case where a printer engine is a laser beam printer engine. In the printer engine, a full-color image such as a photograph or the like can be also formed in addition to data such as characters or the like. Although FIG. 1 shows a case where external apparatuses 101 which function as data processing apparatuses are connected to a printer in a one-to-one correspondence relation, the invention can be also applied to a case where a plurality of data processing apparatuses are connected to the printer through a predetermined communication medium (network). As external apparatuses 101, there are various apparatuses such as personal computer, network computer, digital camera, scanner, and the like. Explanation will now be made hereinbelow with respect to a host computer as an example.

As shown in FIG. 1, for example, a laser beam printer 102 which can output a color image is constructed by: a printer controller 103 to which image information (hereinafter, referred to as print data) including color multivalue information of a predetermined page describing language system is inputted from the external apparatus 101 such as a host computer or the like and which forms image data by analyzing the print data; a printer engine (hereinafter, referred to as an engine) 105 for printing an image shown by the image data formed by the printer controller 103 onto a paper; and a panel portion 104 for interfacing with the user and performing an inputting operation to instruct a desired operation to the laser beam printer 102. Reference numeral 105A denotes a detecting portion having a detecting chip for recognizing a spectrum or the like every plane and every frame for, for example, the image data YMCK which is received from the printer controller 103 and collating with a dictionary table (file), thereby detecting the presence or absence of fake data, and for notifying the printer controller 103 of a detection result.

A construction of the laser beam printer of the embodiment will now be described with reference to FIG. 2.

Figure 2:
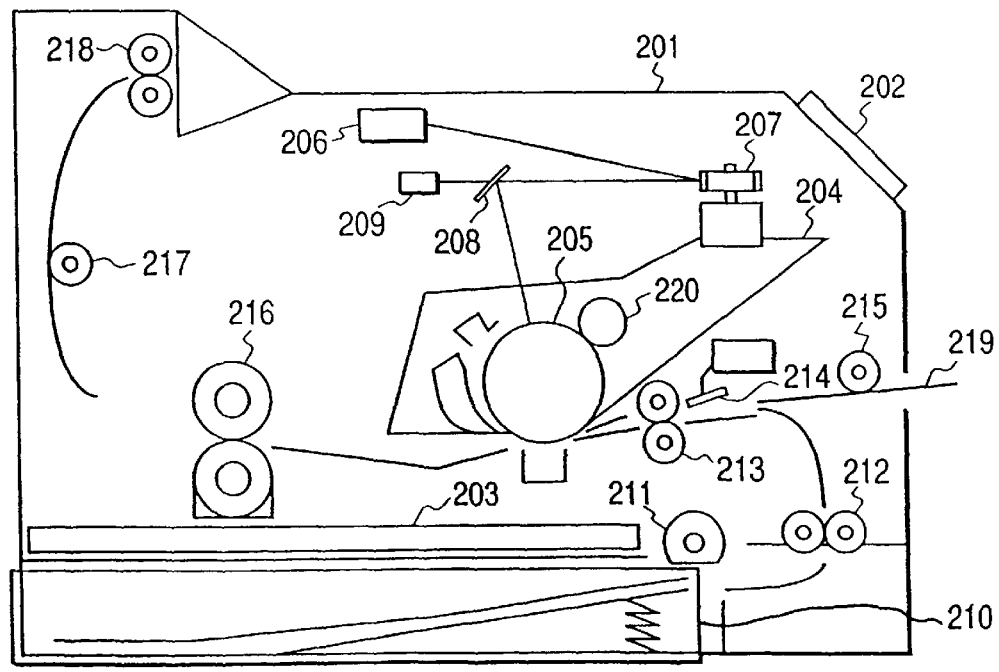
FIG. 2 is a block diagram for explaining a construction of a printer engine shown in FIG. 1.

FIG. 2 is a block diagram for explaining a construction of the printer engine 105 shown in FIG. 1.

Figure 4:
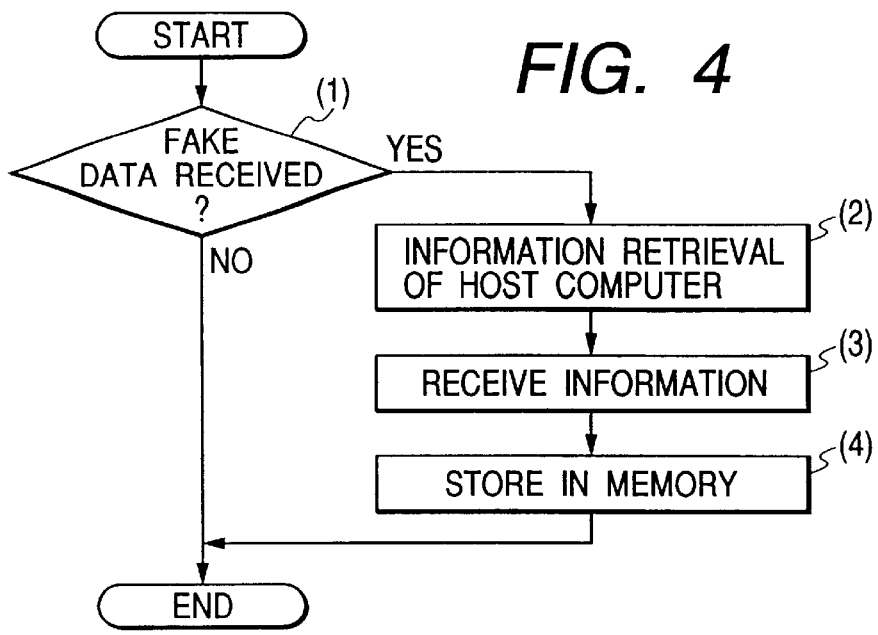
FIG. 4 is a flowchart showing an example of a first data processing procedure in an output control apparatus according to the invention.

As shown in FIG. 2, the laser beam printer 102 has a casing 201. Each mechanism to construct the printer engine 105 and a control board enclosing portion 203 for enclosing an engine control portion (the details are shown in FIG. 4) to perform a control with respect to each printing process (for example, paper feeding process or the like) which is executed by each of the mechanisms and the printer controller 103 (shown in FIG. 1) are built in the casing 201. Reference numeral 106 in FIG. 1 denotes a hard disk which functions as a spooler for storing various font data and form data and accumulating the received print information. The hard disk 106 also stores the received fake data (print data) into a specific area together with a reception time, an obtaining source, and the like and manages them. It is assumed that the reading operation for the specific area of the hard disk 106 under the control of the printer controller 103 is managed in a manner such that the reading operation by persons except for a specific manager or a person who inputted a specific password is impossible.

As mechanisms for constructing the printer engine 105, there are provided: an optical processing mechanism for forming an electrostatic latent image onto a photosensitive drum by a scan of a laser beam, developing the electrostatic latent image, and transferring a developed image onto a print paper; a fixing processing mechanism for fixing a toner image transferred to the print paper; a paper feed processing mechanism of the print paper; and a conveyance processing mechanism of the print paper.

The optical processing mechanism has a laser driver 206 for on/off driving a laser beam which is emitted from a semiconductor laser (not shown) in accordance with the image data supplied from the printer controller 103. The laser beam emitted from the semiconductor laser is swung in the main scanning direction by a rotary polygon mirror 207.

The laser beam swung in the main scanning direction is guided to a photosensitive drum 205 through a reflecting mirror 208 and exposes the surface on the photosensitive drum 205 in the main scanning direction. An electrostatic latent image is formed on the photosensitive drum 205 by a scan exposure by the laser beam. The latent image is developed to a toner image by toner which is supplied from a developing unit 220. As toner, each toner of Y (yellow), M (magenta), C (cyan), and K (black) is used. The toner image on the photosensitive drum 205 is transferred onto the print paper which is fed synchronously in the sub scanning direction by the paper feed processing mechanism.

The photosensitive drum 205 and developing unit 220 are enclosed in a detachable cartridge 204. The reflecting mirror 208 is constructed by a semi-transparent mirror and a beam detector 209 is arranged on the back side. The beam detector 209 detects the laser beam and its detection signal is supplied to the printer controller 103. On the basis of the detection signal of the beam detector 209, the printer controller 103 forms a horizontal sync signal (corresponding to a /BD signal) to decide an exposure timing in the main scanning direction. The horizontal sync signal is outputted to the printer engine 105.

The fixing processing mechanism has a fixing unit 216 to fix the toner image transferred to the print paper by a thermal pressure. A heater to heat the toner image is provided for the fixing unit 216. The heater is controlled by the engine control portion so as to obtain a predetermined fixing temperature.

Further, the paper feeding mechanism of the print paper has a cassette 210 to enclose the print papers and a tray 219 for manual insertion and is constructed so as to selectively feed the print paper in the cassette 210 or the print paper on the manual inserting tray 219. The cassette 210 is attached in the casing 201. A size detecting mechanism for electrically detecting a size of print paper in accordance with a moving position of a partition plate (not shown) is provided for the cassette 210.

The print papers are conveyed one by one from the top from the cassette 210 to a paper feed roller 212 by a rotation of a cassette feed clutch 211. The cassette feed clutch 211 is constructed by a cam which is intermittently rotated by drive means (not shown) every paper feed. Each time the cam is rotated once, one print paper is fed.

The paper feed roller 212 conveys the print paper to a position where its front edge portion reaches a resist shutter 214. The resist shutter 214 performs the stop of the paper feeding operation of the print paper and its cancellation by the pressing of the fed print paper and its cancellation. The operation of the resist shutter 214 is controlled synchronously with the sub scan of the laser beam.

On the other hand, the manual inserting tray 219 is provided for the casing 201. The print paper put on the manual inserting tray 219 by the user is fed toward the resist shutter 214 by a paper feed roller 215.

The conveyance processing mechanism of the print paper has: a conveying roller 213 for conveying the print paper in which the pressing force applied by the resist shutter 214 is cancelled toward the photosensitive drum 205; conveying rollers 217 and 218 for guiding the print paper delivered from the fixing unit 216 toward a paper ejecting tray formed on the casing 201; and drive means (not shown) for driving the conveying rollers 213, 217, and 218.

An operation panel 202 to construct the panel portion 104 is attached to the casing 201. Switches to perform an instruction inputting operation and an LED display and an LCD display to display information are provided on the operation panel 202.

A construction of the printer controller 103 will now be described with reference to FIG. 3.

Figure 3:
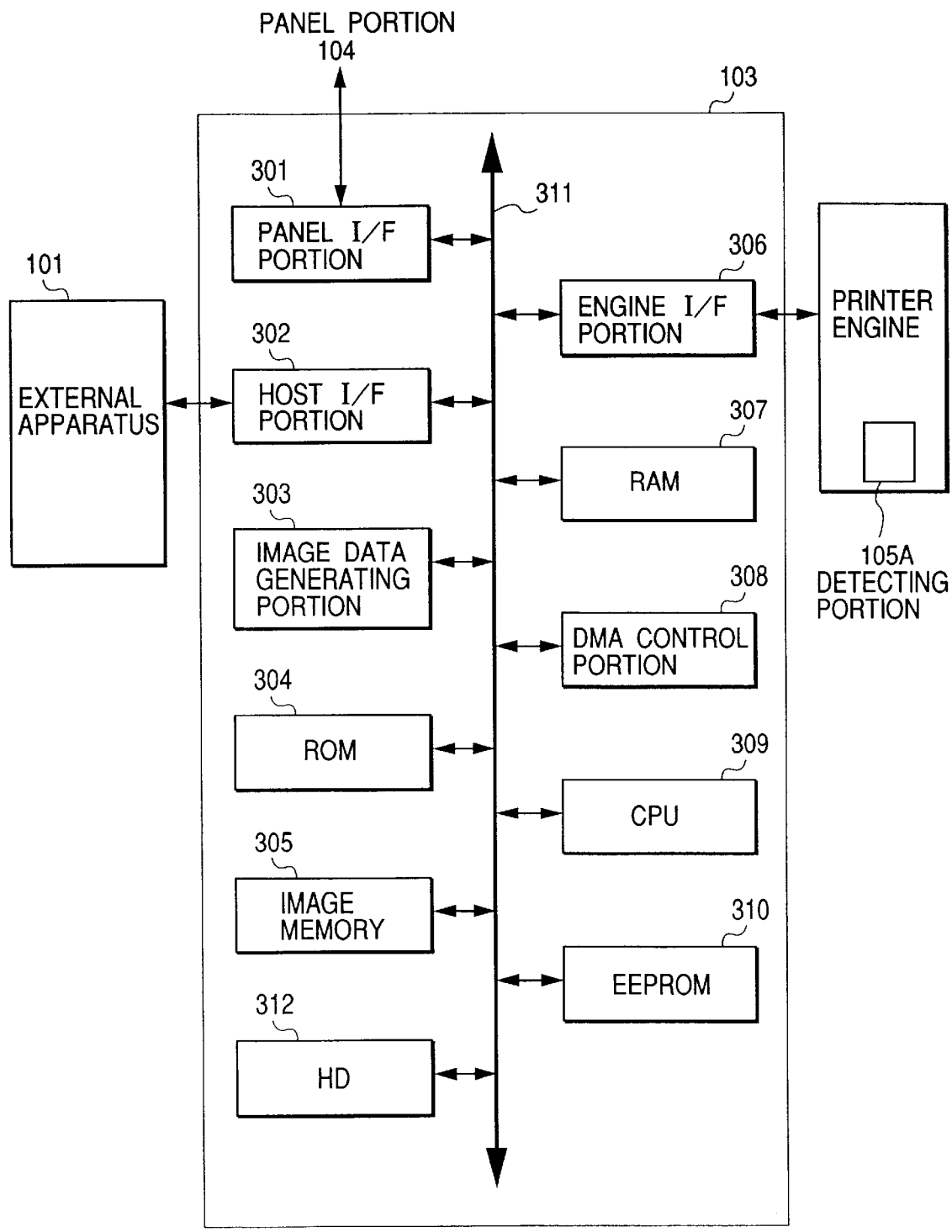
FIG. 3 is a control block diagram for explaining a construction of a printer controller shown in FIG. 1.

FIG. 3 is a control block diagram for explaining a construction of the printer controller 103 shown in FIG. 1. The same component elements as those shown in FIG. 1 are designated by the same reference numerals.

As shown in FIG. 3, the printer controller 103 has a host I/F portion 302 in which an input buffer (not shown) to input the print data transmitted from the external apparatus 101 and an output buffer (not shown) to temporarily hold a signal which is sent to the external apparatus 101. The host I/F portion 302 constructs an input/output portion of signals which are transmitted and received to/from the external apparatus 101 and performs a communication control with the external apparatus 101.

The print data inputted through the host I/F portion 302 is sent to an image data generating portion 303. The image data generating portion 303 executes an analysis (for instance, PDL analyzing process) of the inputted print data on the basis of predetermined analyzing means and forms image data which can be processed by the printer engine 105 from an analysis result.

Specifically speaking, the print data is analyzed and object information is formed by the analysis. In parallel with the formation of the object information, a rasterizing process and a pseudo gradation process are sequentially performed. In the rasterizing process, a converting process from display colors RGB (additive color mixture) included in the print data to YMCK (subtractive color mixture) which can be processed by the printer engine 105 and a converting process from character codes included in the print data to font data such as bit patterns, outline fonts, or the like which has previously been stored are executed. Bit map data is formed on a band unit basis. The pseudo gradation process using a dither pattern is performed to the bit map data of the band unit, thereby forming image data which can be print processed. The formed image data is stored into an image memory 305. The reading operation of the image data stored in the image memory 305 is controlled by a DMA control portion 308. A control for the reading operation of the image data from the image memory 305 by the DMA control portion 308 is performed on the basis of an instruction from a CPU 309.

The image data read out from the image memory 305 is transferred as a video signal to the printer engine 105 through an engine I/F portion 306. An output buffer (not shown) to temporarily hold the video signal which is transferred to the printer engine 105 and an input buffer (not shown) to temporarily hold the signal transmitted from the printer engine 105 are provided for the engine I/F portion 306. The engine I/F portion 306 constructs an input/output portion of the signals which are transmitted and received to/from the printer engine 105 and executes a communication control with the printer engine 105.

An instruction or the like regarding the mode setting outputted by an operation input from the panel portion 104 (shown in FIG. 1) is inputted through a panel I/F portion 301. The panel I/F portion 301 constructs an interface between the panel portion 104 and CPU 309.

The CPU 309 executes a control for each of the foregoing blocks in response to the mode instructed from the panel portion 104. This control is executed on the basis of a control program stored in the ROM 304. The control program stored in the ROM 304 is constructed by: an operating system (OS) to perform a time-divisional control on a unit basis of a load module called a task in response to a system clock and a plurality of load modules which are executed and controlled on a function unit basis by the OS. The control program including the load modules is stored in an EEPROM (non-volatile memory) 310 as necessary.

An RAM 307 is used as a work area of an arithmetic operating process by the CPU 309. Each block including the CPU 309 mentioned above is connected to a system bus 311 so that the CPU 309 can access. The system bus 311 is constructed by an address bus and a system bus.

When it is detected by the printer engine 105 that the print data includes data of securities such as bills or the like (faking act), such a fact is notified to the printer controller 103 and necessary processes are executed in the printer controller 103. Reference numeral 312 denotes a hard disk which functions in a manner similar to the hard disk 106 shown in FIG. 1.

It is also possible to construct in a manner such that the foregoing dictionary table is stored in the RAM 307 of the printer controller 103, an algorithm for discrimination of a fake is stored into an ROM 304, and the CPU 309 is allowed to perform a discriminating process according to the algorithm stored in the ROM 304. In this case, since the faking act can be detected at a time point when the print data is outputted to the printer engine 105, a discrimination timing speed can be set to a high speed.

A characteristic construction of the embodiment will now be described with reference to FIG. 3 and the like.

An output control apparatus for processing output requests from a plurality of data processing apparatuses (external apparatuses 101) through a predetermined communication medium constructed as mentioned above comprises: detecting means for analyzing a kind of data which is received from each of the data processing apparatuses and detecting whether the data is specific data whose output is limited or not; specifying means for, when the detecting means detects the specific data, retrieving any one of the data processing apparatuses which transferred the specific data and specifying; obtaining means for obtaining predetermined identification information from any one of the data processing apparatuses specified by the specifying means; and storing means for storing the predetermined identification information obtained by the obtaining means. Therefore, trace information showing that the illegal output request has been generated from any one of the data processing apparatuses is managed and a location of such a data processing apparatus can be easily confirmed.

An output control apparatus for processing output requests from a plurality of data processing apparatuses through a predetermined communication medium comprises: detecting means for analyzing a kind of data which is received from each of the data processing apparatuses and detecting whether the data is specific data whose output is limited or not; and notifying means for, when the detecting means detects the specific data, notifying each of the data processing apparatuses of a fact that the specific data is being received. Therefore, a generating state of an illegal output request is notified to the external user and a monitoring consciousness for the output request of the specific data can be raised.

Further, an output control apparatus for processing output requests from a plurality of data processing apparatuses through a predetermined communication medium comprises: detecting means for analyzing a kind of data which is received from each of the data processing apparatuses and detecting whether the data is specific data whose output is limited or not; and storing means for storing the specific data detected by the detecting means. Therefore, the contents of the specific data for the illegal output request from any one of the data processing apparatuses can be easily confirmed.

Since the storing means is constructed by a non-volatile storage medium, the contents of the specific data for the illegal output request from any one of the data processing apparatuses can be easily confirmed any time.

A fake detecting process according to the invention will now be described hereinbelow with reference to a flowchart shown in FIG. 4.

FIG. 4 is a flowchart showing an example of a first data processing procedure in the output control apparatus according to the invention and corresponds to a procedure at the time of detection of a fake which is executed by the CPU 309 of the printer controller 103 shown in FIG. 1. Reference numerals (1) to (4) denote processing steps.

An output apparatus having the output control apparatus which is connected via a network and to which the embodiment can be applied receives the print data which is transmitted from an external apparatus such as a host computer or the like that is connected to the output apparatus. When it is detected that the received print data is fake data such as a bill or the like in which the printing is legally inhibited (1), the external apparatuses 101 such as host computer which transmitted the print data (fake data) added to the print data and information thereof are retrieved (2). The printer controller 103 obtains various information which can be obtained such as network address on the network of the external apparatus 101 such as a host computer which transmitted the print (fake) data or the like, host name showing the user of the external apparatus, kind of host external apparatus 101, and the like (3).

The obtained information is subsequently stored into a memory (not shown) (for example, NVRAM area in the RAM 307) under certain specific conditions so that it can be extracted (read out) as necessary (4).

In step (1), in the case where it is determined that the received print data is not fake data such as a bill or the like in which the printing is legally inhibited, the processing routine is finished and an ordinary printing sequence (not shown) is executed.

Thus, when it is recognized that the print data received through the network or the like is illegal data, information to specify a transmission source of the print data is automatically obtained and can be preserved and managed in a memory. The information can be referred or printed out at an arbitrary timing.

It is now assumed that a discrimination reference about whether the fake data has been received or not in step (1) conforms to, for example, the method disclosed in Japanese Patent Application No. 63-114801. For example, a specific color pattern (for instance, in case of using a printing portion as a specific color pattern, a red signet shape) which a bill or securities have is matched with the print data by a well-known pattern matching method, thereby realizing such a discrimination.

As another method, if a specific code such as a bar code or the like printed on a bill shows the kind, manufacturing number, or the like of the bill, securities, or the like, the presence or absence of fake can be also discriminated by identifying this specific code.

As a method of retrieving information of the external apparatus in step (2), there is a method of obtaining an IP address which is derived as a protocol when the print data is transmitted.

In the case where the output apparatus is connected to a plurality of external apparatuses, a host computer to manage a network comprising a plurality of external apparatuses and output apparatus is provided. Since the host computer has network addresses of a plurality of external apparatuses, when a fake is detected in the output apparatus, various information can be also obtained by inquiring to the host. Further, when the information is extracted in step (4), by inputting a specific condition, for example, a password to the display panel of the printer, only a network manager or the like who knows the password can extract the information.

[Second Embodiment]

The first embodiment has been described with respect to the case where when the illegal print data is received, the host information to specify the transfer source of the print data is automatically obtained and is preserved and managed by the memory resource. However, it is also possible to construct in a manner such that when the illegal print data in which the printing is legally inhibited is received, a message showing a fact that the illegality has been performed is notified in a lump to all of a plurality of external apparatuses connected to the network or is notified to the designated host computer. An embodiment of such a case will now be described. The designated host computer is a computer to manage the network comprising a plurality of host computers and the output apparatus or a host computer corresponding to the IP address which has previously been registered in the HD of the output apparatus. It is preferable to use a computer address of a manufacturer which presented the output apparatus, the police, or the like as an IP address.

Figure 5:
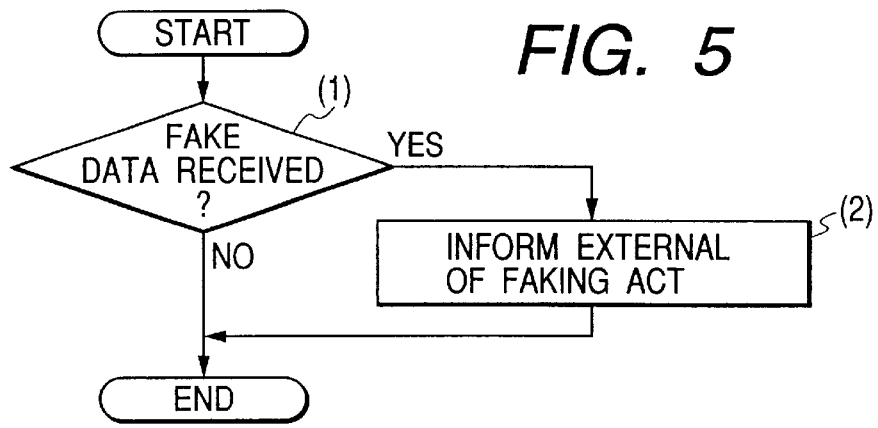
FIG. 5 is a flowchart showing an example of a second data processing procedure in the output control apparatus according to the invention.

FIG. 5 is a flowchart showing an example of a second data processing procedure in the output control apparatus according to the invention and corresponds to a procedure which is executed by the CPU 309 of the printer controller 103 shown in FIG. 1 at the time of fake detection. Reference numerals (1) and (2) denote processing steps.

In the output apparatus which is connected to the network, when it is determined that the print data transmitted from the external apparatus such as a computer or the like which is connected is fake data showing a bill or the like (1), a fact that the fake has been detected is notified through a bidirectional interface to the external apparatus such as a computer or the like connected to the output apparatus and to the network (2). The processing routine is finished.

When it is determined in step (1) that the received print data is not the fake data showing, for example, a bill or the like in which the printing is legally inhibited, the processing routine is finished and an ordinary printing sequence (not shown) is executed.

Thus, when it is recognized that the print data received through the network or the like is data in which the printing is legally inhibited, at a generation time point of the message showing such a fact, the user of any one of the external computers connected to the network can certainly recognize the presence or absence of the reception of the illegal print data.

[Third Embodiment]

The first embodiment has been described with respect to the case where when the illegal print data is received, the host information to specify the transfer source of the print data is automatically obtained and is preserved and managed by the memory resource. However, when the print data (fake data) in which the printing is illegal is received, such print data can be also preserved and managed by a memory resource. An embodiment in such a case will now be described hereinbelow.

Figure 6:
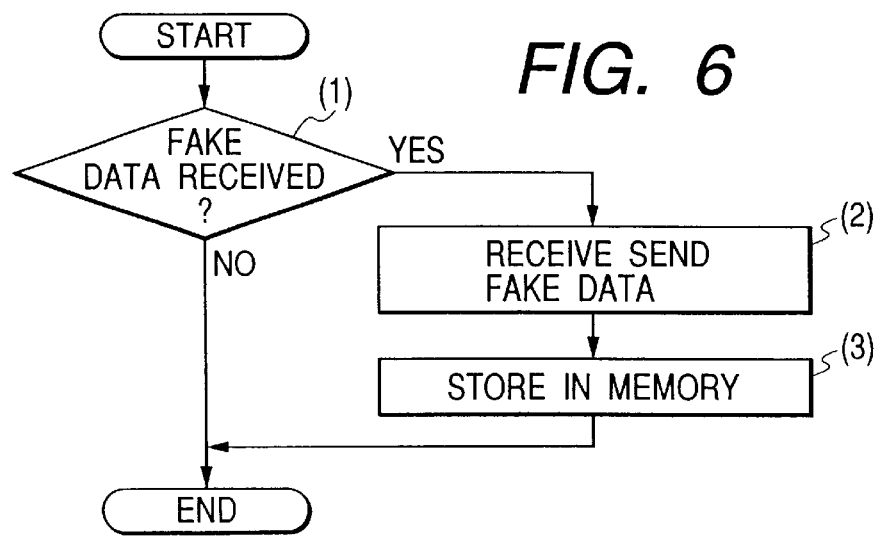
FIG. 6 is a flowchart showing an example of a third data processing procedure in the output control apparatus according to the invention.

FIG. 6 is a flowchart showing an example of a second data processing procedure in the output control apparatus according to the invention and it is a procedure which is executed by the CPU 309 of the printer controller 103 shown in FIG. 1 at the time of fake detection. Reference numerals (1) to (3) denote processing steps.

As mentioned in the first embodiment, in the output apparatus which is connected to the network, when it is detected that the print data transmitted from the external apparatus such as a computer or the like which is connected is data showing securities such as bills or the like (1), all of the print data (fake data) which is transmitted from the external apparatuses such as a computer and the like connected to the output apparatus is received by the printer controller 103 (2).

The received print data (fake data) is stored onto the hard disk 106 or the like so that it can be extracted (read out) as necessary under a certain specific condition (3) and the processing routine is finished.

When it is determined in step (1) that the received print data is not the fake data such as a bill or the like in which the printing is legally inhibited, the processing routine is finished and an ordinary printing sequence (not shown) is executed.

Thus, when it is recognized that the print data received through the network or the like is the illegal data, this print data can be preserved and managed in a memory and such information can be referred or printed out at an arbitrary timing. The print data (fake data) showing the bill (securities) received through the network or the like is subjected to a compressing process in a software manner by the CPU 309 in accordance with a compressing program such as a JPEG or the like which has previously been stored in the ROM 304 and is stored onto the hard disk 106.

When a residual memory capacity of the hard disk 106 is smaller than a predetermined amount, it is possible that the foregoing print data (fake data) is deleted by the elapsed time after the accumulation which is calculated on the basis of the time point when the data is stored and the current time.

However, even in case of erasing the foregoing fake data, it is possible that the information of the host which issued a print request of the print data (fake data) is managed as history information of the fake data without erasing.

If the print data is the data corresponding to the bill or the like, the processing routine is finished as mentioned above and the print data is stored onto the hard disk 106. Further, the following operations are executed.

1) A control signal is outputted to the external apparatus 101 or the computer which manages the network so as to allow the external apparatus 101 or computer for managing the network to display "Report to service person".

2) The output apparatus is set to an unusable state by turning off a power supply of the output apparatus or the like. By using this construction, the use of the output apparatus in which somebody tried to fake bills can be stopped.

By enabling the service person to print in a service person mode the foregoing illegal print data stored on the hard disk 106, it is possible to explain that the reason of the power-off is based on the cause of the erroneous use by the user.

When considering that the object of the storage of the print data (fake data) to the hard disk 106 is to print the print data so that it can be confirmed later, a thumbnail image of the print data can be also used as a print data which is stored on the hard disk 106.

A characteristic construction of the embodiment will now be described hereinbelow with reference to FIGS. 4 to 6 and the like.

There is provided an output control method of processing output requests from a plurality of data processing apparatuses through a predetermined communication medium constructed as mentioned above or a computer-readable storage medium in which a program for processing output requests from a plurality of data processing apparatuses through a predetermined communication medium has been stored, wherein the above method or program comprises: a detecting step of analyzing a kind of data which is received from each of the data processing apparatuses and detecting whether the data is specific data whose output is limited or not; a specifying step of, when the specific data is detected by the detecting step, retrieving any one of the data processing apparatuses which transferred the specific data and specifying; an obtaining step of obtaining predetermined identification information from any one of the data processing apparatuses specified by the specifying step; and a storing step of storing the predetermined identification information obtained by the obtaining step into a memory. Therefore, trace information showing that the illegal output request has been generated from any one of the data processing apparatuses is managed and a location of such a data processing apparatus can be easily confirmed.

There is provided an output control method of processing output requests from a plurality of data processing apparatuses through a predetermined communication medium or a computer-readable storage medium in which a program for processing output requests from a plurality of data processing apparatuses through a predetermined communication medium has been stored, wherein the above method or program comprises: a detecting step of analyzing a kind of data which is received from each of the data processing apparatuses and detecting whether the data is specific data whose output is limited or not; and a notifying step of, when the specific data is detected by the detecting step, notifying each data processing apparatus of a fact that the specific data is being received. Therefore, a generating state of the illegal output request is notified to the external user and the monitoring consciousness for the output request of the specific data can be raised.

Further, there is provided an output control method of processing output requests from a plurality of data processing apparatuses through a predetermined communication medium or a computer-readable storage medium in which a program for processing output requests from a plurality of data processing apparatuses through a predetermined communication medium has been stored, wherein the above method or program comprises: a detecting step of analyzing a kind of data which is received from each of the data processing apparatuses and detecting whether the data is specific data whose output is limited or not; and a storing step of storing the specific data detected by the detecting step into a memory. Therefore, the contents of the specific data for the illegal output request from any one of the data processing apparatuses can be easily confirmed.

A construction of data processing programs which can be read out by an output system to which the output control apparatus according to the invention can be applied will now be described hereinbelow with reference to a memory map shown in FIG. 7.

FIG. 7 is a diagram for explaining the memory map of a storage medium to store various data processing programs which can be read out by the output system to which the output control apparatus according to the invention can be applied.

Although not particularly shown, information to manage the programs which are stored in the storage medium, for example, version information, persons who made the programs, and the like are also stored. There is also a case where information depending on the OS or the like on the program reading side, for example, icons or the like to identify and display the programs are also stored.

Further, data depending on the various programs is also managed in the directories. There is also a case where a program to install the various programs into the computer, a program to decompress an installing program in the case where the installing program has been compressed, and the like are stored.

The functions shown in FIGS. 4 to 6 in the embodiment can be also executed by the host computer by programs which are installed from the outside. In this case, the invention is also applied to a case where an information group including the programs is supplied to the output apparatus from a storage medium such as CD-ROM, flash memory, FD, or the like or from an external storage medium through the network.

It will be obviously understood that the objects of the invention are accomplished by a method whereby a storage medium in which program codes of software to realize the functions of the foregoing embodiments have been recorded is supplied to a system or an apparatus and a computer (or CPU or MPU) of the system or apparatus reads out and executes the program codes stored in the storage medium.

In this case, the program codes themselves read out from the storage medium realize the novel functions of the invention and the storage medium in which the program codes have been stored accomplishes the invention.

As a storage medium to supply the program codes, for example, it is possible to use any one of a floppy disk, a hard disk, an optical disk, a magnetooptic disk, a CD-ROM, a CD-R, a magnetic tape, a non-volatile memory card, an ROM, an EEPROM, and the like.

It will be obviously understood that the invention also incorporates not only a case where the functions of the foregoing embodiments are realized by executing the read-out program codes by the computer but also a case where on the basis of an instruction of the program codes, the OS (Operating System) or the like which is operating on the computer executes a part or all of the actual processes and the functions of the foregoing embodiments are realized by the processes.

Further, it will be also obviously understood that after the program codes read out from the memory medium was written into a memory provided for a function expanding board inserted into the computer or a function expanding unit connected to the computer, on the basis of an instruction of the program codes, a CPU or the like provided for the function expanding board or function expanding unit executes a part or all of the actual processes, and the functions of the foregoing embodiments are realized by the processes.

An output control apparatus for processing output requests from a plurality of data processing apparatuses through a predetermined communication medium as mentioned above comprises: detecting means for analyzing a kind of data which is received from each of the data processing apparatuses and detecting whether the data is specific data whose output is limited or not; specifying means for, when the detecting means detects the specific data, retrieving any one of the data processing apparatuses which transferred the specific data and specifying; obtaining means for obtaining predetermined identification information from any one of the data processing apparatuses specified by the specifying means; and storing means for storing the predetermined identification information obtained by the obtaining means. Therefore, trace information showing that the illegal output request has been generated from any one of the data processing apparatuses is managed and a location of such a data processing apparatus can be easily confirmed.

Further, an output control apparatus for processing output requests from a plurality of data processing apparatuses through a predetermined communication medium comprises: detecting means for analyzing a kind of data which is received from each of the data processing apparatuses and detecting whether the data is specific data whose output is limited or not; and notifying means for, when the detecting means detects the specific data, notifying each of the data processing apparatuses of a fact that the specific data is being received. Therefore, a generating state of an illegal output request is notified to the external user and a monitoring consciousness for the output request of the specific data can be raised.

Further, an output control apparatus for processing output requests from a plurality of data processing apparatuses through a predetermined communication medium comprises: detecting means for analyzing a kind of data which is received from each of the data processing apparatuses and detecting whether the data is specific data whose output is limited or not; and storing means for storing the specific data detected by the detecting means. Therefore, the contents of the specific data for the illegal output request from any one of the data processing apparatuses can be easily confirmed.

Since the storing means is constructed by a non-volatile storage medium, the contents of the specific data for the illegal output request from any one of the data processing apparatuses can be easily confirmed any time.

There is provided an output control method of processing output requests from a plurality of data processing apparatuses through a predetermined communication medium constructed or a computer-readable storage medium in which a program for processing output requests from a plurality of data processing apparatuses through a predetermined communication medium has been stored, wherein the above method or program comprises: a detecting step of analyzing a kind of data which is received from each of the data processing apparatuses and detecting whether the data is specific data whose output is limited or not; a specifying step of, when the specific data is detected by the detecting step, retrieving any one of the data processing apparatuses which transferred the specific data and specifying; an obtaining step of obtaining predetermined identification information from any one of the data processing apparatuses specified by the specifying step; and a storing step of storing the predetermined identification information obtained by the obtaining step into a memory. Therefore, trace information showing that the illegal output request has been generated from any one of the data processing apparatuses is managed and a location of such a data processing apparatus can be easily confirmed.

There is provided an output control method of processing output requests from a plurality of data processing apparatuses through a predetermined communication medium or a computer-readable storage medium in which a program for processing output requests from a plurality of data processing apparatuses through a predetermined communication medium has been stored, wherein the above method or program comprises: a detecting step of analyzing a kind of data which is received from each of the data processing apparatuses and detecting whether the data is specific data whose output is limited or not; and a notifying step of, when the specific data is detected by the detecting step, notifying each data processing apparatus of a fact that the specific data is being received. Therefore, a generating state of the illegal output request is notified to the external user and the monitoring consciousness for the output request of the specific data can be raised.

Further, there is provided an output control method of processing output requests from a plurality of data processing apparatuses through a predetermined communication medium or a computer-readable storage medium in which a program for processing output requests from a plurality of data processing apparatuses through a predetermined communication medium has been stored, wherein the above method or program comprises: a detecting step of analyzing a kind of data which is received from each of the data processing apparatuses and detecting whether the data is specific data whose output is limited or not; and a storing step of storing the specific data detected by the detecting step into a memory. Therefore, the contents of the specific data for the illegal output request from any one of the data processing apparatuses can be easily confirmed.

Therefore, there are advantages such that the trace information showing from which one of the data processing apparatuses the illegal output request has been issued can be managed, the generating state of the illegal output request is notified to the external user, the monitoring consciousness for the output request of the specific data can be raised, and the like.

What is claimed is:

1. A print apparatus which prints print data from plural computers connected through a network, comprising:

receiving means for receiving the print data and discrimination information added to the print data, which indicates a computer of a transmission source of the print data, from the plural computers;

first discriminating means for discriminating which computer transmitted the print data, on the basis of the discrimination information;

second discriminating means for analyzing the print data received from the plural computers and discriminating whether the data is specific data whose output is limited; and storing means for storing the information regarding the computer discriminated by said first discriminating means when it is determined by said second discriminating means that the print data is the specific data.

2. A print apparatus which prints print data from plural computers connected through a network, comprising:

receiving means for receiving the print data and discrimination information added to the print data, which indicates a computer of a transmission source of the print data, from the plural computers;

discriminating means for analyzing the print data received from the plural computers and discriminating whether the print data is specific data whose output is limited; and notifying means for notifying the plural computers connected to the network that a fake action was performed when it is determined by said discriminating means that the print data is the specific data.

3. An apparatus according to claim 1, wherein said storing means stores the print data when it is determined by said second discriminating means that the print data is the specific data.

4. An apparatus according to claim 1, wherein said storing means is a non-volatile storage medium.

5. An apparatus according to claim 1, wherein the discrimination information is a network address or information indicating the user of the computer.

6. An apparatus according to claim 1, wherein said second discriminating means discriminates a specific color pattern or a specific code.

7. An apparatus according to claim 3, wherein said storing means compresses and stores the print data.

8. An apparatus according to claim 3, wherein although the print data stored in said storing means is erased at a predetermined timing, the discrimination information stored in said storing means is not erased.

9. An apparatus according to claim 3, wherein said storing means stores a thumbnail image of the print data.

10. A control method for a print apparatus which prints print data from plural computers connected through a network, said method comprising:

a receiving step of receiving the print data and discrimination information added to the print data, which indicates a computer of a transmission source of the print data, from the plural computers;

a first discriminating step of discriminating which computer transmitted the print data, on the basis of the discrimination information;

a second discriminating step of analyzing the print data received from the plural computers and discriminating whether the print data is specific data whose output is limited; and a storing step of storing the information regarding the computer discriminated in said first discriminating step when it is determined in said second discriminating step that the print data is the specific data.

11. A control method for a print apparatus which prints print data from plural computers connected through a network, comprising:

a receiving step of receiving the print data and discrimination information added to the print data, which indicates a computer of a transmission source of the print data, from the plural computers;

a discriminating step of analyzing the print data received from the plural computers and discriminating whether the print data is specific data whose output is limited; and a notifying step of notifying the plural computers connected to the network that a fake action was performed, when it is determined in said discriminating step that the print data is specific data.

12. A computer-readable storage medium in which is stored a program for controlling a computer having a print apparatus for printing print data from plural computers connected through a network, said program comprising codes for causing said computer to perform:

a receiving step of receiving the print data and discrimination information added to the print data, which indicates a computer of a transmission source of the print data, from the plural computers connected to the network;

a first discriminating step of discriminating which computer transmitted the print data, on the basis of the discrimination information;

a second discriminating step of analyzing the print data received from the plural computers and discriminating whether the print data is specific data whose output is limited; and a storing step of storing the information regarding the computer discriminated in said first discriminating step when it is determined in said second discriminating step that the print data is the specific data.

13. A computer-readable storage medium in which is stored a program for controlling a computer having a print apparatus for printing print data from plural computers connected through a network, said program comprising codes for causing said computer to perform:

a receiving step of receiving the print data and discrimination information added to the print data, which indicates a computer of the transmission source of the print data, from the plural computers;

a discriminating step of analyzing the print data received from the plural computers and discriminating whether the print data is specific data whose output is limited; and a notifying step of notifying the plural computers connected to the network that a fake action was performed, when it is determined in said discriminating step that the print data is the specific data.

* * * * *

UNITED STATES PATENT AND TRADEMARK OFFICE
CERTIFICATE OF CORRECTION

PATENT NO.    : 6,608,692 B1
DATED         : August 19, 2003
INVENTOR(S)   : Yasuko Shibahara et al.

It is certified that error appears in the above-identified patent and that said Letters Patent is hereby corrected as shown below:

Column 1,
Line 28, "a" (second occurrence) should read -- an --.

Column 5,
Line 19, "has," should read -- have --;
Line 58, "An" should read -- A --; and
Line 61, "access." should read -- have access. --

Column 6,
Line 3, "construct" should read -- construct an apparatus --; and
Line 5, "an" should read -- a --.

Column 7,
Line 67, "construct" should read -- construct an apparatus --.

Column 11,
Line 13, "magnetooptic" should read -- magneto-optic --;
Line 14, "an" should read -- a --; and
Line 26, "was" should read -- were --.

Signed and Sealed this

Thirteenth Day of January, 2004

JON W. DUDAS
*Acting Director of the United States Patent and Trademark Office*